(12) United States Patent
Vaculik et al.

(10) Patent No.: US 12,523,686 B2
(45) Date of Patent: Jan. 13, 2026

(54) POWER-METER APPARATUS, CIRCUITS AND METHODS

(71) Applicant: NXP USA, Inc., Austin, TX (US)

(72) Inventors: Lukas Vaculik, Valasske Mezirici (CZ); Radek Holis, Karolinka (CZ)

(73) Assignee: NXP USA, Inc., Austin, TX (US)

( * ) Notice: Subject to any disclaimer, the term of this patent is extended or adjusted under 35 U.S.C. 154(b) by 307 days.

(21) Appl. No.: 18/484,942

(22) Filed: Oct. 11, 2023

(65) Prior Publication Data

US 2024/0125830 A1 Apr. 18, 2024

(30) Foreign Application Priority Data

Oct. 12, 2022 (EP) .................................... 22201102

(51) Int. Cl.
*G01R 21/133* (2006.01)
*G01R 21/127* (2006.01)

(52) U.S. Cl.
CPC ..... *G01R 21/1331* (2013.01); *G01R 21/1278* (2013.01)

(58) Field of Classification Search
CPC . G01R 21/1331; G01R 21/1278; G01R 22/10
USPC ......................................................... 324/153
See application file for complete search history.

(56) References Cited

U.S. PATENT DOCUMENTS

| | | | | |
|---|---|---|---|---|
| 3,987,308 A | * | 10/1976 | Burch | H02J 3/14 307/41 |
| 4,241,237 A | * | 12/1980 | Paraskevakos | H04M 11/002 379/40 |
| 4,261,037 A | * | 4/1981 | Hicks | G06Q 30/04 340/657 |
| 4,301,508 A | * | 11/1981 | Anderson | G01R 11/66 702/58 |
| 4,399,510 A | * | 8/1983 | Hicks | G06Q 50/06 705/412 |
| 4,433,387 A | * | 2/1984 | Dyer | G06F 3/007 714/48 |
| 4,455,453 A | * | 6/1984 | Parasekvakos | H04M 11/002 340/3.3 |
| 5,059,896 A | * | 10/1991 | Germer | G01R 15/09 324/141 |
| 5,245,275 A | * | 9/1993 | Germer | G01R 15/09 702/117 |
| 5,258,704 A | * | 11/1993 | Germer | G01R 21/133 324/130 |
| 5,289,115 A | * | 2/1994 | Germer | G01R 15/09 324/142 |

(Continued)

*Primary Examiner* — Christopher P Mcandrew

(57) ABSTRACT

A power-meter includes a digital signal processor (DSP) configured to determine a respective consumed energy within each of a plurality of predetermined contiguous time intervals, a dequantizer, and a pulse generator. The dequantizer is configured to, for each time interval, determine a sum of a remainder and the consumed energy, calculate an integer pulse-count by dividing the sum of the remainder and the consumed energy by a predetermined pulse-quantum, calculate a new remainder by subtracting the product of the integer pulse-count and the pulse-quantum from the sum, and replace the remainder by the new remainder The pulse generator is configured to, for each time interval, generate the integer pulse-count number of pulses of an indicator signal.

20 Claims, 8 Drawing Sheets

(56) References Cited

U.S. PATENT DOCUMENTS

| | | |
|---|---|---|
| 6,246,831 B1 | 6/2001 | Seitz et al. |
| 7,622,911 B2 | 11/2009 | Dempster et al. |
| 7,847,537 B2 | 12/2010 | Makinson et al. |
| 9,684,037 B2 | 6/2017 | Hardy et al. |
| 10,107,842 B2 | 10/2018 | Mienkina et al. |
| 2016/0266180 A1 | 9/2016 | Mienkina et al. |
| 2018/0059745 A1* | 3/2018 | Gross ................ H05K 7/20836 |

* cited by examiner

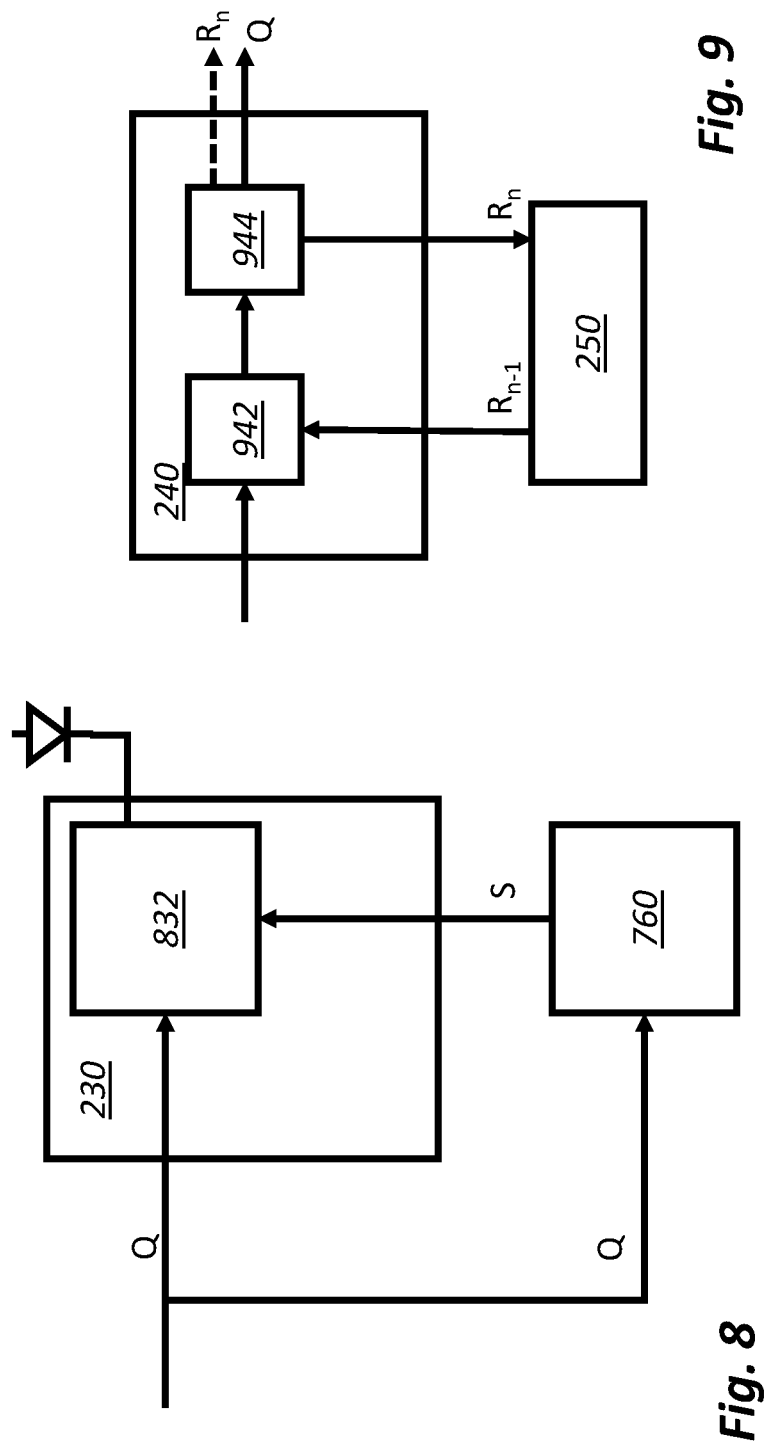

POWER-METER APPARATUS, CIRCUITS AND METHODS

CROSS-REFERENCE TO RELATED APPLICATIONS

This application claims the priority under 35 U.S.C. § 119 of European Patent application no. 22201102.5, filed on 12 Oct. 2022, the contents of which are incorporated by reference herein.

FIELD

The present disclosure relates to circuits and apparatus for power metering and associated methods.

BACKGROUND

Power metering is used in a variety of applications such as but not limited to domestic (household) electrical energy consumption, and pricing for charging of electric vehicles at commercial charge stations. A pulse output signal is a standard method of measurement used in such power metering applications. The concept is derived from traditional mechanical power meters in which an aluminium disc is configured to rotate with a speed proportional to the power consumption, and a pulse is recorded each time a marker (such as a red line) on the disc crosses a reference checkpoint. More recently the disc-based mechanical meters have been replaced by electronic meters, and the marker crossing the checkpoint replaced by an LED "blink". ("Blink" as used herein is generally meant a short on-pulse or flash. However the signal may, alternatively, be inverted so as to be normally-on or alight such that blink could be considered as a short off-pulse).

In some applications, the amount of energy corresponding to a single pulse or blink may be referred to as an "impulse number". Alternatively, it may be referred to through the reciprocal of the impulse number, that is to say through a "pulse-quantum", or quantum of energy per pulse. Impulse number may be defined in units of "imp/kWh, and pulse-quantum in units of kWh/pulse. So, for example, an impulse number of 2000 imp/kWh refers to an apparatus in which 2000 impulses are generated by a consumption of 1 kWh (that is to say a power of 1 kW being used for 1 hour). Since there are 3600 seconds in each hour, in this example a pulse would occur after each 3600/2000s, that is to say there is one pulse every 1.8 seconds if the load if 1 kW. For a typical mains-based application in a region where the mains frequency is 50 Hz, a pulse then occurs once every 90 mains cycles. A pulse-quantum in this example corresponds to an energy of 1.8 kJ.

There are an increasing number of applications for which it is desirable or required to meter power at significantly higher levels. A non-limiting example is automobile charging stations where the load may be of the order of 100 times higher. Moreover suppliers are increasingly interested in larger impulse numbers (such that the energy quantum per pulse is smaller, i.e. the pulse-quantum is smaller) in order to improve the pulse resolution.

In such instances there may be one or even more than one pulse per mains cycle. It will be apparent to the skilled person that the simple measure of "number of cycles per quantum" or even "number of quanta per cycle" will not result in an accurate measure of the energy consumption, and that more sophisticated measurement techniques are desirable.

SUMMARY

According to a first aspect of the present disclosure, there is provided a power-meter apparatus comprising: a digital signal processor, DSP, configured to determine a respective consumed energy within each of a plurality of predetermined contiguous time intervals; a dequantizer configured to, for each time interval: determine a sum of a remainder and the consumed energy, calculate an integer pulse-count by dividing the sum of the remainder and the consumed energy by a predetermined pulse-quantum, calculate a new remainder by subtracting the product of the integer pulse-count and the pulse-quantum from the sum, and replace the remainder by the new remainder; and a pulse generator configured to, for each time interval, generate the integer pulse-count number of pulses of an indicator signal. Use of "integer arithmetic" in determining the energy, that is to say calculating an integer pulse-count and a remainder, and reapplying the remainder in a further calculation, may provide for a particularly convenient implementation using software and/or hardware as appropriate. It may even allow standard, pre-existing hardware units, or functionality in a microcontroller unit (MCU) or similar hardware to be used, thereby reducing design effort and costs. Furthermore, such an apparatus may allow use of convenient values for the pulse-quantum and/or the time interval.

According to one or more embodiments, the indicator signal is an LED, and the pulse of the indicator signal is a blink of the LED. An LED may be a convenient form of indicator signal, and use of blinks of the LED may be a convenient form of transferring the meter output detail.

According to one or more embodiments, each blink of the LED has a same on-time. Such consistency may provide for convenient implementation.

According to one or more embodiments the pulse generator both is configured to receive the pulse-count and the new remainder from the dequantizer, and comprises a pulse-smoothing unit configured to adjust a timing of the pulses of the indicator signal. Use of a pulse-smoothing unit configured to adjust the timing of the pulses of the indicator signal may allow for an output which is smoother than would otherwise be the case, and in turn this may provide a more robust measurement which is less susceptible to noise on the system.

According to one or more such embodiments the pulse-smoothing unit may be configured to adjust the timing of the pulses of the indicator signal in response to the remainder, to tend to equalise, or smooth changes to, a frequency of the pulses for a plurality of time intervals. Adjusting the timing of the pulses in order to smooth them out over time may make the output more robust against noise and similar artefacts, for instance by allowing high frequency filtering to filter out any noise-based spikes.

According to one or more embodiments the power-meter apparatus of any preceding may further comprise: a current meter and first analog-to-digital converter, configured to make a plurality of current measurements in each time interval; and a voltage meter and a second analog-to-digital converter, configured to make a plurality of voltage measurements in each time interval. Measuring voltage and converting that to a digital value, and measuring current and converting the current to a digital value may allow for more accurate measurements.

According to one or more such embodiments, the DSP is configured to calculate a plurality of power values in each time interval from the plurality of current measurements and the plurality of voltage measurements, and determine the respective consumed energy from the plurality of power values. Combining the digitized measurements of current and voltage may, in particular enable a better distinguishing of real and reactive power.

According to one or more embodiments, the power meter apparatus further comprises a register configured to store the remainder as a digital value. The register may be overwritten with the new remainder after each calculation.

According to one or more embodiments the dequantizer is further configured to set the remainder to 0 prior to the first time interval. Setting to the remainder to 0 on the commencement of the measurements may avoid inappropriately calculating a consumed power based on a previous use of the system.

According to one or more embodiments the power-meter apparatus further comprises a monitor, configured to feedback, to the pulse generator, a number of generated pulses of the indicator signal. Use of a monitor and such feedback may avoid spurious or noise-based pulses being recorded in error.

According to a second aspect there is provided A method of metering power consumption, the method comprising: determining a respective consumed energy within each of a plurality of predetermined contiguous time intervals; for each time interval: determining a sum of a remainder and the consumed energy, calculating an integer pulse-count by dividing the sum of the remainder and the consumed energy by a predetermined pulse-quantum, calculating a new remainder by subtracting a product of the integer pulse-count and the predetermined pulse-quantum from the sum, replacing the remainder by the new remainder, and generating the integer pulse-count number of pulses of an indicator signal.

In one of more embodiments, each pulse of the indicator signal is a blink of an LED. The method may further comprise adjusting a timing of the pulses of the indicator signal by means of a pulse-smoothing unit. The method further comprise adjusting a timing of the pulses of the indicator signal in response to the remainder, to tend to equalise a frequency of the pulses for a plurality of time intervals. The method may further comprise calculating a plurality of power values in each time interval from a plurality of current measurements and a plurality of voltage measurements, and determine the respective consumed energy from the plurality of power values. The method may further comprise making a plurality of current measurements in each time interval; and making a plurality of voltage measurements in each time interval.

According to one or more embodiments the method may comprise calculating a plurality of power values in each time interval from the plurality of current measurements and the plurality of voltage measurements, and determining the respective consumed energy from the plurality of power values. It may further comprise storing the remainder as a digital value in a register. It may further comprise setting the remainder to 0 prior to a first time interval. It may further comprise providing a feedback of a number of generated pulses of the indicator signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which

FIG. 8 shows an example of a pulse generator according to embodiments such as that depicted in FIG. 7 in more detail; and FIG. 9 illustrates a possible implementation of the dequantizer block 240 according to one or more embodiments.

Figure 1:
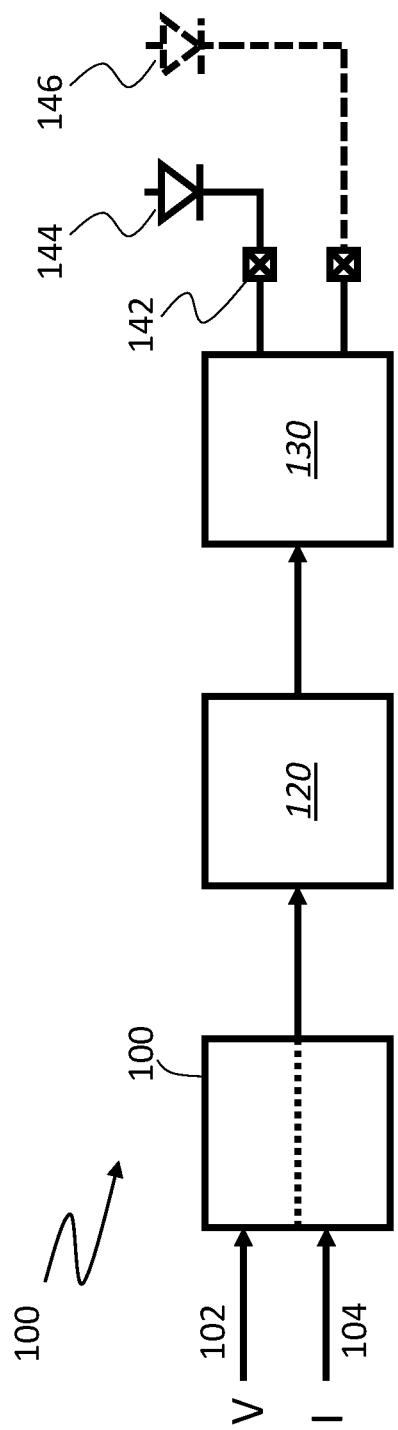
FIG. 1 illustrates, schematically, a basic concept for power metering.

It should be noted that the Figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 illustrates, schematically, a basic conventional concept for power metering. The apparatus 100 receives as inputs 102 and 104 instantaneous values of the voltage V and current I. These are processed by analog to digital converter (ADC) unit 110, which may be implemented as separate ADCs for current and voltage. The ADC unit 110 may form part of a conventional analog front end (AFE) circuit such as is well-known in integrated circuit devices. The values are passed to a DSP metering unit, or block, 120. DSP metering block 120 may calculate power, energies and other metering signal values, as needed. The output of the DSP metering block 120 corresponding to consumed energy is passed to a pulse generator 130, which generates the appropriate number of pulses corresponding to the consumed energy. The algorithm employed in the DSP metering block converts the signal from a time domain to a frequency domain (for instance using a Fast Fourier Transform, FFT, or similar method). The pulse generator 130 provides at its output 142 a signal to control the LED 144 to produce an appropriate number of blinks. There may be, as shown a second output to control a second LED 146. Use of a pair of LED outputs enables separate measurements of real (also known as true, or resistive) energy consumption and reactive energy usage. In particular real energy consumption (that is to say the energy consumption calculated using the in-phase measurement of current and voltage) may be indicated by the blinks of LED 144, and reactive energy consumption (that is to say the "imaginary" power in which the voltage is in quadrature or 90° out of phase from the current) by the blinks of LED 146. The skilled person will appreciate that in the latter arrangement with two LEDs, the DSP metering unit 120 carries out a separate calculation for each of the real and reactive energy consumption, and pulse generator 130 is duplicated.

As already mentioned in the introduction, electricity meters such as those illustrated in FIG. 1 use a constant called the "impulse number" (corresponding to the reciprocal of a "pulse-quantum"). This constant is used to convert the actual measure of energy to robust shareable data which is represented by the frequency of the output pulses on the LED. The output pulse frequency has an upper limit which is defined by the operation of the DSP and pulse generator. Furthermore, the granularity of the measurement defines a lower limit to the pulse frequency. One or more embodiments of the present disclosure may enable a finer granularity (that is to say a more precise measurement) and relax the pulse frequency lower limit.

Figure 2:
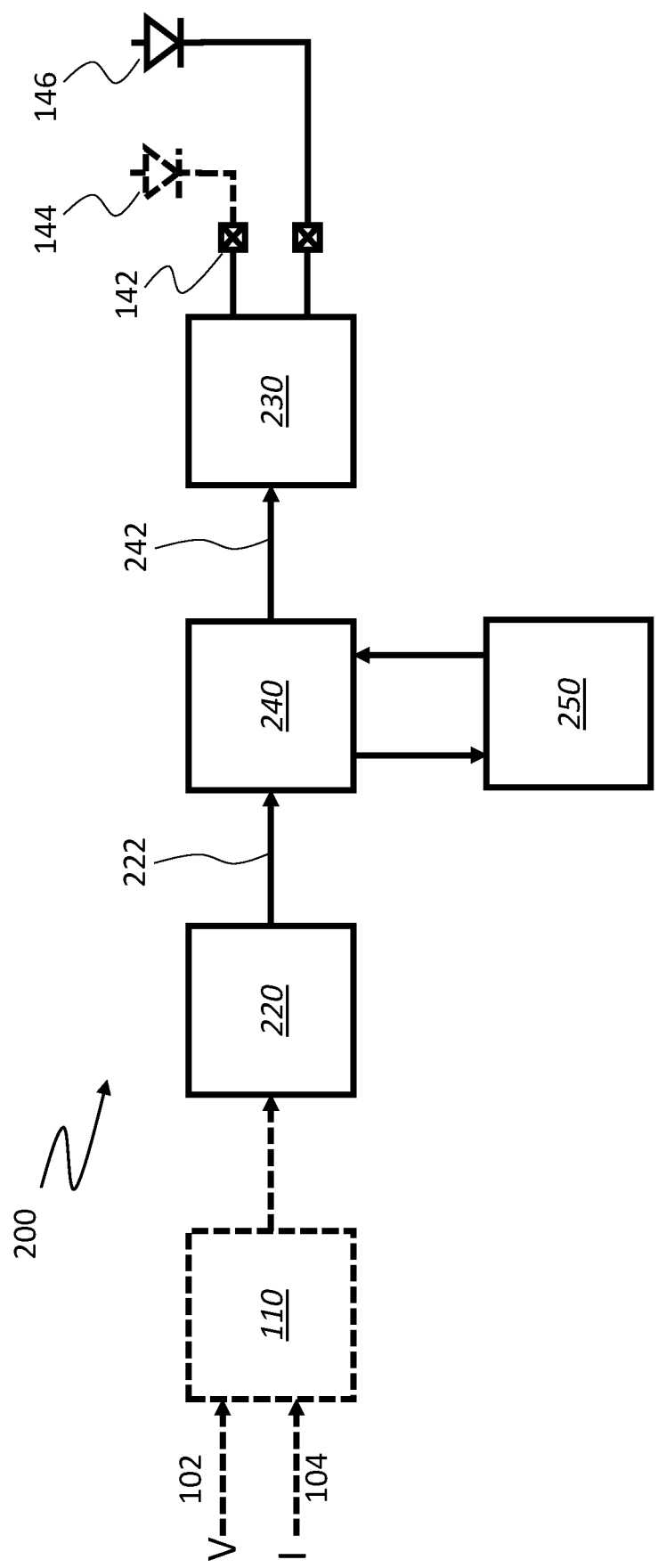
FIG. 2 illustrates, schematically, a concept for power metering according to one or more embodiments of the present disclosure.

FIG. 2 illustrates, schematically, a concept for power metering according to one or more embodiments of the present disclosure. The figure shows a power-meter apparatus 200. The power-meter apparatus 200 comprises a digital signal processor, DSP, 220 configured to determine a respective consumed energy within each of a plurality of predetermined contiguous time intervals. The consumed energy may be output from the power meter, at or soon after the end of each time interval, as a digital signal 222 indicative of the energy consumed during that time interval. Generally, the time intervals in all have the same duration. However, the disclosure is not limited thereto and the time intervals may be allowed to vary in duration.

The power-meter apparatus further comprises a dequantizer, or dequantizer block, 240. The dequantizer is configured to, for each time interval, determine a pulse-count and a remainder. The pulse-count is indicative of a number of pulses to be generated by a pulse generator 230. It is determined by taking the integer resulting from dividing the sum of the energy consumed during the last time interval and a previously stored remainder, by a pulse-quantum. In other words, the energy consumed during the last time interval is combined with the leftover energy ("remainder") from the previous calculation, and the number of complete quanta is calculated using integer arithmetic. In general the division does not result in an exact integer, so an amount of energy is leftover. This becomes the remainder for the next calculation. As a nonlimiting example, consider an apparatus for which the pulse-quantum is 100 J: if the previous remainder is 37 J, and the DSP determines that 615 J have been consumed during the last time interval, the dequantizer 240 divides the unaccounted used energy of (37+615 J i.e. 652 J) by pulse-quantum of 100 J to result in a pulse-count of 6, corresponding to 600 J. This leaves a new remainder of 52 J, which will be added to the energy consumed in the next time interval for determining the next number of pulses, and so on. Put another way, the dequantizer is further configured to calculate a new remainder by subtracting the product of the integer pulse-count and the pulse-quantum from the sum, and to replace the remainder by the new remainder. It will be appreciated that for a first calculation or determination, the remainder should be 0. This can be achieved, for instance by writing a value of zero into a register in which the remainder is stored, prior to the first calculation or determination.

The power meter apparatus 200 further comprises a pulse generator 230. The pulse generator is configured to, for each time interval, generate the integer pulse-count number of pulses of an indicator signal. The pulse-count is output from the dequantizer to the pulse generator by means of the signal 242.

The pulse generator provides a control signal at output 142. Output 142 may be connected to an LED 144, which may be integral to or separate to the apparatus. The apparatus may include an ADC unit 110, similar to a conventional system, which receive or receives the voltage and current instantaneous measurements at 102 and 104 respectively. It will be appreciated that, corresponding to the power metering system shown in FIG. 1, a second set of measurements and calculations may be used to determine a reactive energy consumption, which may be output by blinks of the second LED 146.

Figure 3:
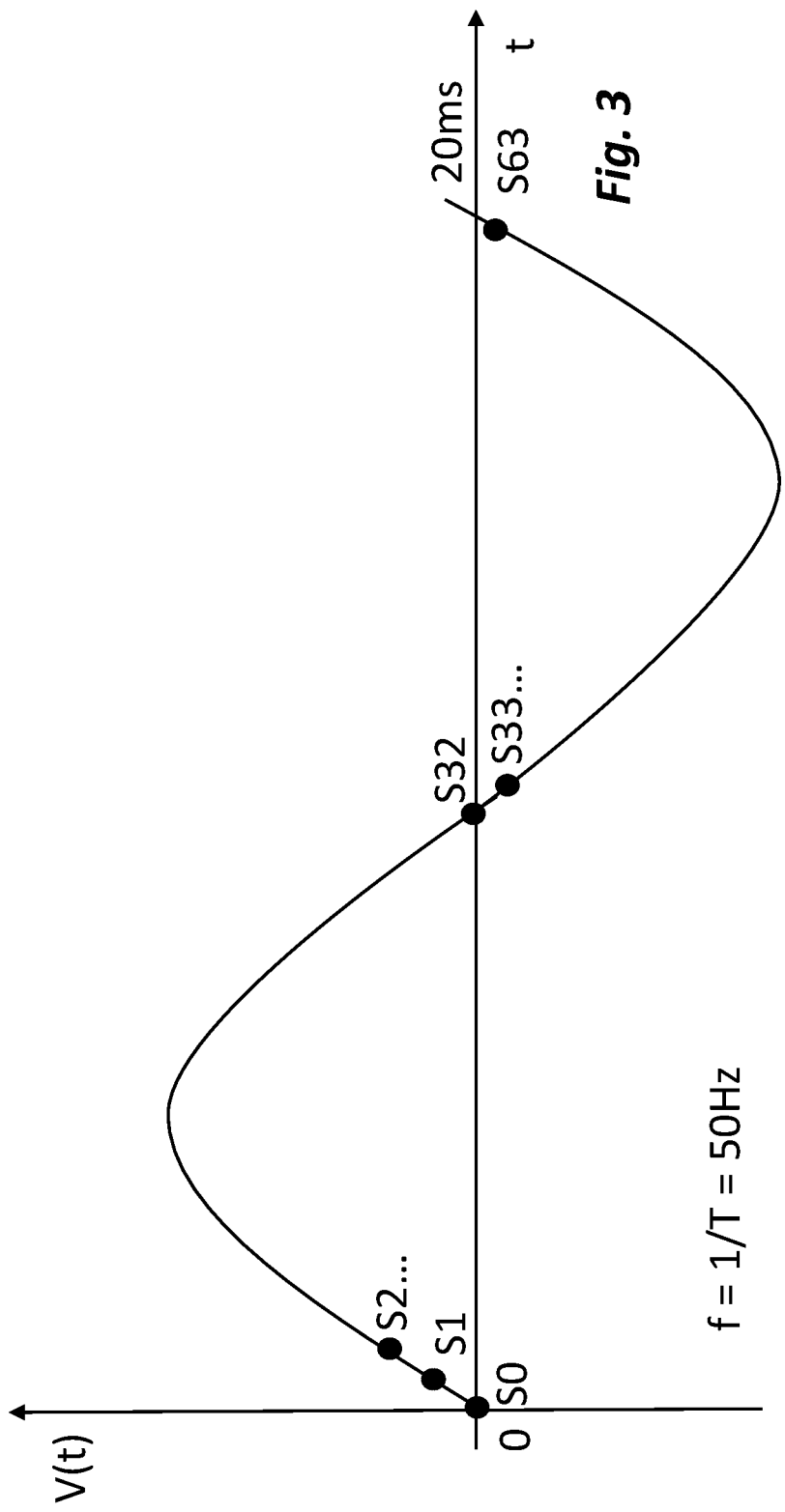
FIG. 3 show a plot of voltage V(t) over single mains cycle, against time, showing individual measurement moments.

As discussed above, the DSP 220 provides an indication of consumed energy over a predetermined time interval. Conveniently the time interval may correspond to one cycle, or an integer number of cycles, of an AC supply, the power of which is being measured. In order to do so, the measurement system provides an integer number of measurements of current and voltage within a cycle of the AC supply. Preferably the integer is a power of 2 (i.e. corresponds to $2^N$): this allows simple use of mathematical techniques such as Fast Fourier Transform (FFT) using harmonic symmetry (sine or cosine), to improve the calculation speed. For example, in the case of a domestic mains power metering with a 50 Hz AC supply (corresponding to a 20 ms cycle time), there may be 64 measurements per cycle, that is to say 64 measurements in 20 ms so a measurement is taken every 312.5 µs. This is illustrated pictorially in FIG. 3 in which a voltage V(t) over single mains cycle, that is to say from 0 to 20 ms, is plotted against time, and a series S0, S1, S2 . . . S63 of voltage measurements are made throughout the cycle. Current measurements are made at the same instance S0, S1, etc. The skilled person will appreciate that conventional integrated circuits including analog front-ends typically have a pair of ADCs built-in, the sampling moments of which are aligned by the IC design.

Figure 4:
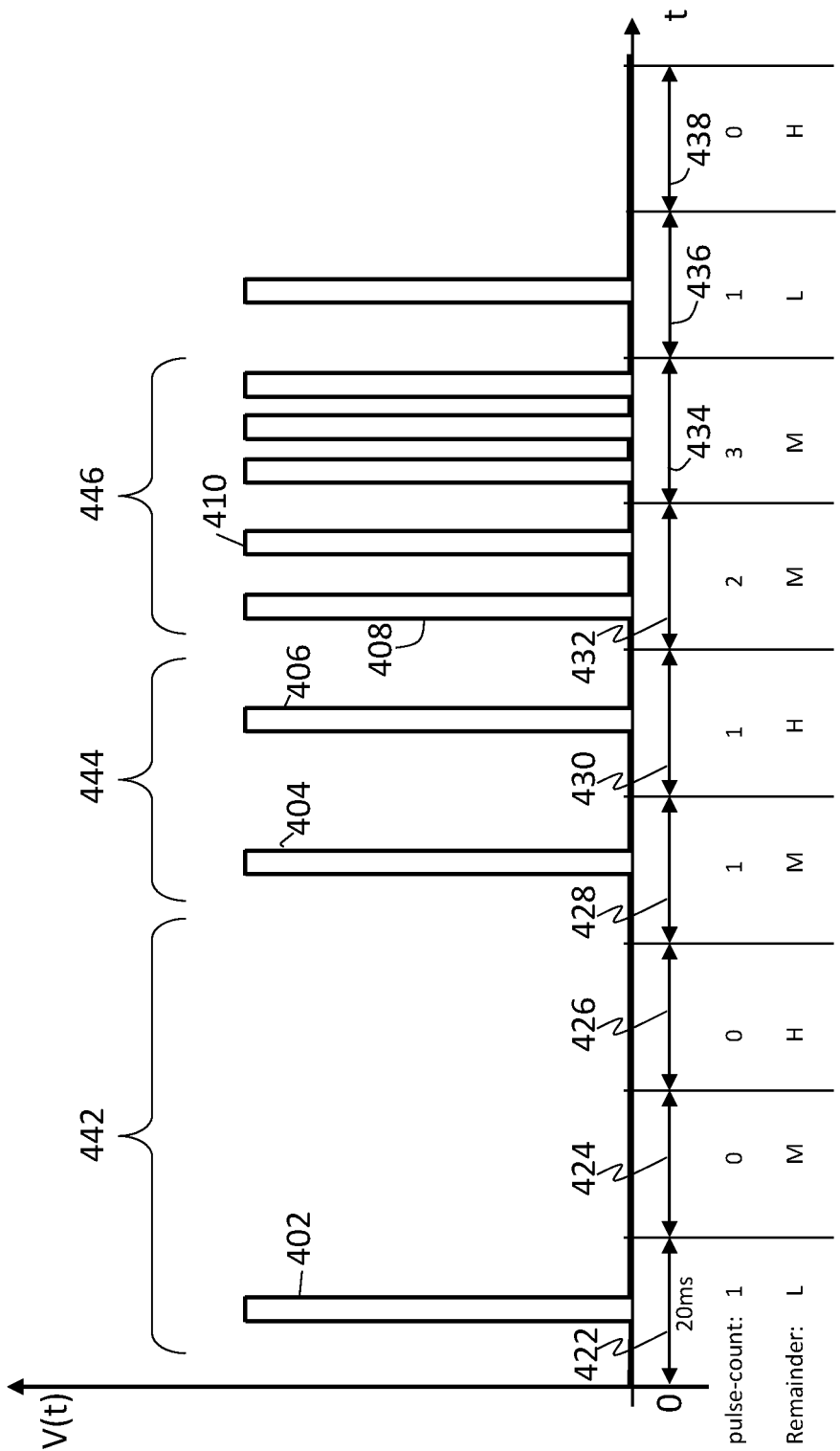
FIG. 4 shows an example of the output from the pulse generator to the LED, under various power consumption conditions.

FIG. 4 shows an example of the output from the pulse generator 230 to the LED 144, under various power consumption conditions. The figure shows pulses 402, 404, 406, etc. . . . each corresponding to a blink of the LED, over contiguous time intervals 422, 424, 426, etc. In this illustrative example, each time interval corresponds to a single cycle of the mains supply whose power is being measured and thus corresponds to 20 ms (for a 50 Hz supply). Over the first three mains cycles (that is to say, time intervals 422, 424 and 426, shown as time-span 442) the measured power is low so after a first quantum has been measured (resulting in a pulse-count of one in time interval 422), a second quantum is not reached until time interval 428. The pulse-count in time interval 424 and 426 is thus 0, and the pulse-count in time interval 428 is 0. However, it will be appreciated that during these time intervals 424 and 426 the remainder is increasing, as shown schematically at the bottom of the figure indicating that after the first quantum is reached in time interval 422 the remainder is low ("L"), after time interval 424 the remainder is medium ("M"), and after a time interval 426 the remainder is high ("H"). It will be appreciated that this remainder is added to the energy consumption in time interval 428 resulting in the second pulse, shown at 404.

During a second timespan, shown at 444, and covering time intervals 428 and 430, the power, and energy consumption per time interval, is increasing. As a result, at the end of time interval 428—which includes a pulse, the remainder is already medium, resulting in another pulse during time interval 430, at the end of which the remainder is high. As the power and thus energy consumption per time interval continues to increase, during the next time interval 432 the pulse-count is two resulting in two pulses 408 and 410, together with a medium remainder as shown.

In the example shown, the power and energy consumption continue to increase resulting in a pulse-count of 3, and thus three pulses, for time interval 434. However, after time interval 434, that is to say at the end of a third time-span 446 covering intervals 432 and 434, in this example the power falls, such that the pulse-count in interval 436 is only 1 and the remainder at the end of this interval is low; with a continuing low power, there is insufficient energy consumption during interval 438 to result in a pulse, although the remainder is, as shown, high by the end of this time interval.

It will be appreciated that it used herein, a low or (or "L"), medium (or "M") or high ("H") value of the remainder is indicative of the size of the remainder relative to the pulse-quantum, and these size indicators have been used merely for purposes of illustration: for example, in the case of a pulse-quantum corresponding to 100 J, a remainder in a range of 0-33 J may be considered to be "low", a range of 34-66 J may be considered to be "medium", and a range of 67-99 J may be considered to be "high".

It will also be appreciated that, in the example shown in FIG. 4, the output pulses are distributed evenly within each time interval (which, as already discussed, may correspond to a mains cycle such as 20 ms as shown). Alternatively, the start of the first pulse (for any time period in which there is a pulse) may be aligned with the start of the time period. However, if the pulse position is aligned to a fixed position, the output frequency may vary in time in an un-smooth manner. Knowing the value of the remainder of the energy (which does not form part of a pulse-quantum in the current time period), may enable the output pulses to be smoothed over time. In particular, the position of the or the first pulse relating to a specific time interval may be adjusted within that time interval in dependence on the value of the remainder. For example the first pulse may be brought closer to the start of time interval in the instance that the remainder (at the end of the preceding time interval) is high, since that may be indicative that a pulse is expected soon; conversely the first pulse may be delayed further from the start of the time interval in the instance that the remainder (at the end of the preceding time interval) is low, since that may be indicative that a pulse is not expected soon. Of course it will be appreciated that in the case of low power (in which a pulse is only expected once for every few, or even several, time intervals) a more sophisticated calculation may be carried out, based on the remainder, so as to determine when, within in the specific the time interval, the pulse should be positioned: this calculation would be based on the rate of increase of the remainder compared to the pulse-quantum. The smoothing is generally more effective and useful in the instance of at least one pulse per time interval.

Figure 5:
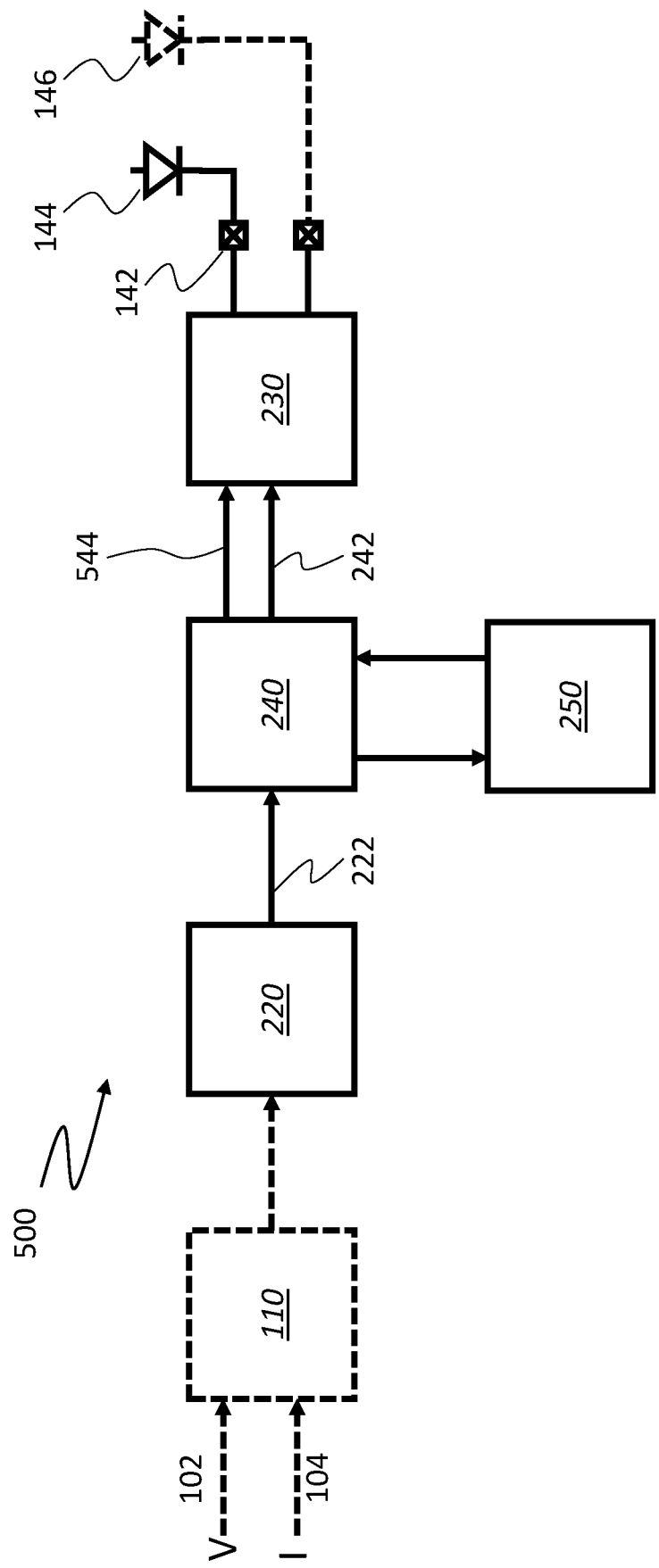
FIG. 5 illustrates, schematically, a power metering apparatus which may provide for pulse smoothing.

FIG. 5 illustrates, schematically, a power metering apparatus 500 according to one or more other embodiments of the present disclosure, which may provide for pulse smoothing. The apparatus is similar to that shown in FIG. 2 except that, in this example, not only the pulse-count 242 is output from the dequantizer to the pulse generator, but also a signal 544 indicative of the remainder is output from the dequantizer to the pulse generator. According to one or more embodiments of the present disclosure, this remainder signal, in conjunction with the pulse-counts, may be used by the signal generator in order to adjust the timing of the or any pulses provided by the pulse generator associated with the time interval, so as to smooth the output to the LED, as described above.

Figure 6:
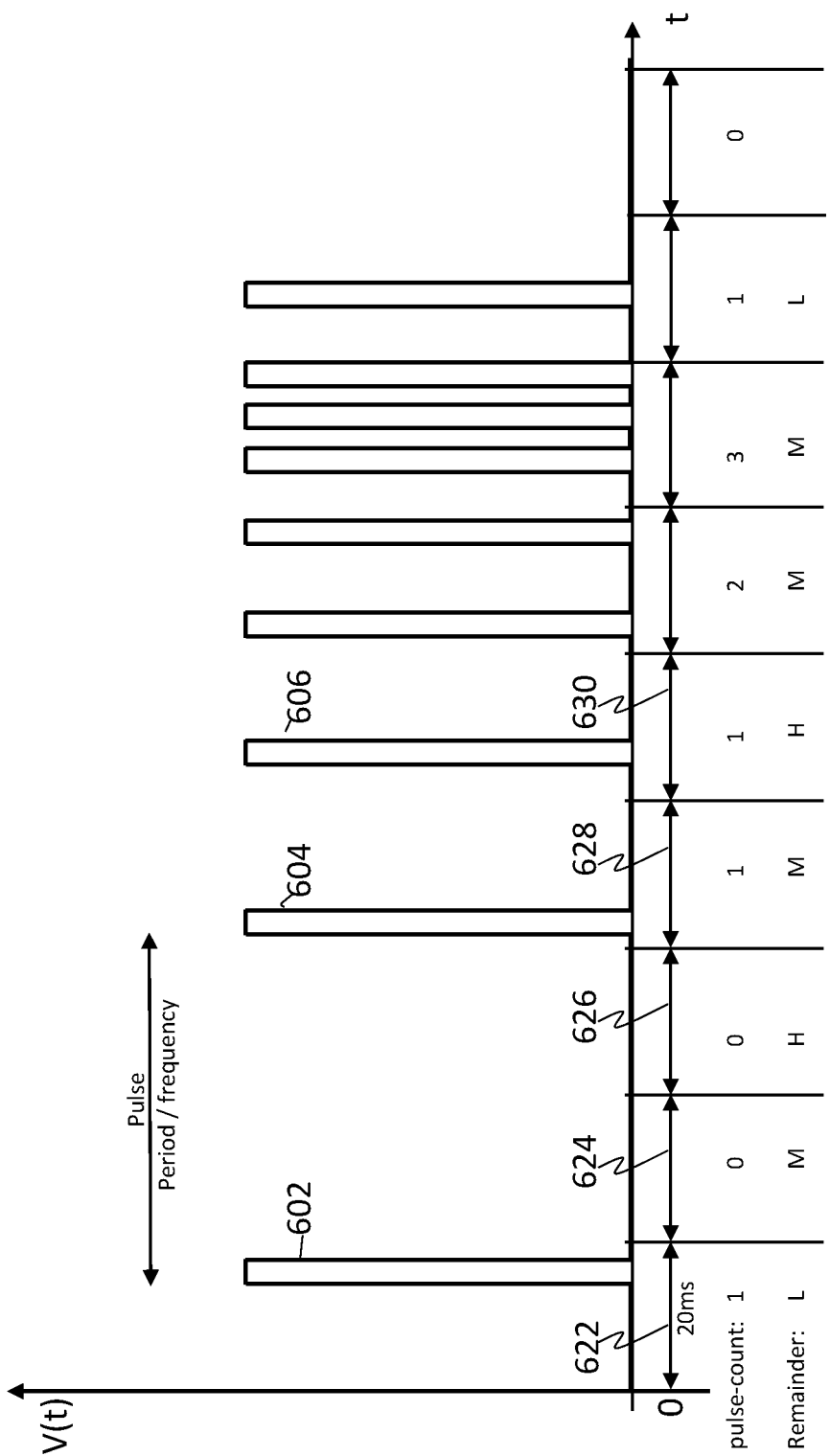
FIG. 6 shows an example of the output from the pulse generator to the LED, under various power consumption conditions, with pulse smoothing.

FIG. 6 shows an example of the output from the pulse generator 230 to the LED 144 with varying energy consumption conditions, under conditions that pulse smoothing has been applied using apparatus such as that shown in FIG. 5. Similar to FIG. 4, the figure shows pulses 602, 604, 606, etc. . . . each corresponding to a blink of the LED, over contiguous time intervals 622, 624, 626, etc., each corresponding to a single cycle of the mains supply whose power is being measured. Over the first three mains cycles (that is to say time intervals 622, 624 and 626, shown as time-span 642) the measured power is low so after a first quantum has been measured (resulting in a pulse-count of one in time interval 622), a second quantum is not reached until time interval 628. However, since the remainder (at the end of time interval 626) is "H" or high, the pulse generator adjusts the start of the pulse in time interval 628 closer to the start of that time interval. Similarly, from the knowledge that there is a pulse in time interval 628 and the remainder at the end of that time interval is already at "M" or medium, the pulse which is required in the subsequent time interval 630 is also adjusted to be closer to the start of that time interval. Dynamically adjusting the pulse position simulates the rotating plate or disc of a mechanical meter rotation as smoothly as possible. The reminder and number of pulses value will give the information where the pulse or pulses will be started at the next "blink" time frame.

Figure 7:
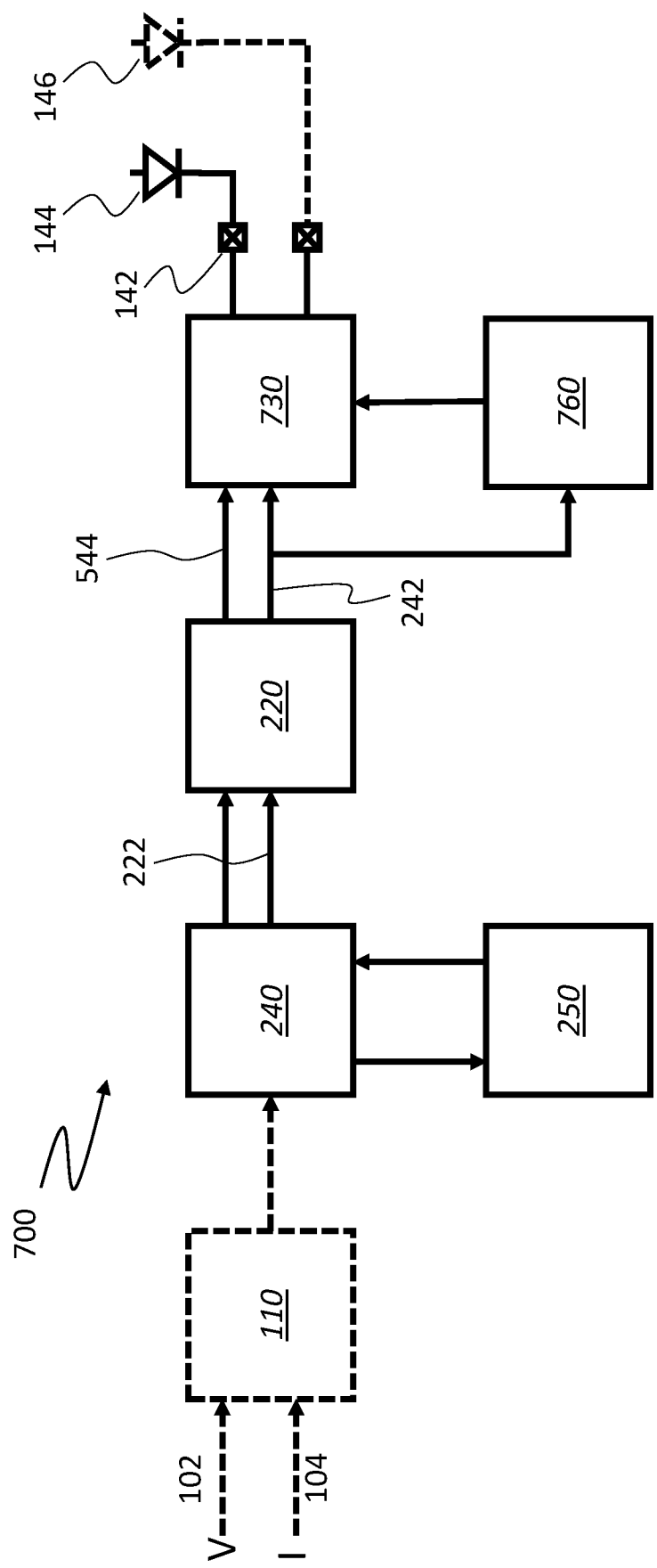
FIG. 7 illustrates, schematically, a power metering apparatus according to one or more other embodiments of the present disclosure.

Turning now to FIG. 7, this illustrates, schematically, a power metering apparatus 700 according to one or more other embodiments of the present disclosure, which may enable an alternative implementation of the pulse generation. Whereas in the embodiment shown in FIG. 5, the pulse generator 730 is configured to generate a fixed number of pulses in dependence on the pulse-count in each time interval, the skilled person will appreciate that alternative implementations or embodiments may be used. One such implementation is depicted in FIG. 7. This figure shows embodiments in which the pulse generator 730 is configured as a timer operable in PWM mode and which is enabled by the signal from the dequantizer. That is to say the pulse generator 730 is configured to start to generate pulses in response to a positive (i.e. greater than zero) pulse-count received from the dequantizer. However, a control signal to stop generation of pulses after the correct number of pulses has been received is provided by a run/stop timer 760. Run/stop timer 760 may be implemented as DMA or ISR, and may provide a hardware signal to the pulse generator 730, to stop generating pulses once the required number— that is to say the pulse-count—has been reached. In order to ensure robustness (and reduce the possibility of electronic tampering of the meter calculations), security should be built in. Using an interrupt request and an interrupt service routine (ISR), may be useful. However, a hardware-based mechanism (such as direct memory access (DMA) event) to write directly to the timer register may provide better security against tampering. It will be appreciated that implementations or embodiments such as that described in FIG. 7 may readily utilise existing hardware of functionality already designed into a microcontroller or other processor chip.

FIG. 8 shows an example of a pulse generator 230 according to embodiments such as that depicted in FIG. 7 in more detail. The pulse generator 230 includes a timer 832, which may be a PWM mode timer, such as may be implemented in a conventional micro-control unit, MCU, or other similar processor. On receipt of the pulse-count, depicted as Q in this figure as will be explained in more detail with respect to FIG. 9, the pulse generator initiates the PWM mode operation of timer 832. Pulse-count Q is also supplied to the run/stop timer 760. After the relevant delay—which is typically time-based—the run/stop timer 760 provides a "stop" signal S to the PWM mode timer 832, in order to switch off the PWM signal generation. The run/stop timer 760 can thus act as a monitor, configured to feedback, to the pulse generator, a number of generated pulses of the indicator signal.

Turning now to FIG. 9, this illustrates, schematically, one possible implementation of the dequantizer block 240 according to one or more embodiments. The skilled person will appreciate that other implementations are equally possible. The dequantizer 240 provides an input to the pulse generator 230 based on the metering signals provided by the DSP metering unit 220. To do so, the dequantizer may receive the indication of energy consumption during the time interval (which may alternatively be referred to as an "energy packet") from the DSP, typically as a digital value. It may also receive, as a second input, an indication of remainder energy, $R_{n-1}$, from the immediately previous calculation as a second digital value, typically from a register 250. The dequantizer sums the two digital values, in summing unit 942. The dequantizer 240 then divides this sum by the pulse-quantum, in division block 944. This results in a quotient Q and a remainder $R_n$. (The subscript n is included to signify that the remainder is the result of this—$n^{th}$—calculation rather than that of the previous, $n-1^{th}$ calculation) The quotient is the (integer) resulting from the division; the remainder is the amount left over by subtracting the product of the quotient and the pulse-quantum from the sum.

The remainder is stored for use in the calculation associated with the next time interval. Typically that is done by replacing the remainder which was previously stored in the register 250 by this new remainder. The quotient Q, is output to the pulse generator as the pulse number, and the remainder R n may also be output to the pulse generator. As already mentioned, prior to a first calculation the remainder (Ro) may be set to equal zero.

Returning to FIGS. 4 and 6, it will be appreciated that the pulses have been drawn corresponding to individual time intervals 422, 424, 426 etc. however, it will be readily apparent to the skilled person that the time intervals 422, 424, 426 etc, are not exactly concurrent with the time intervals over which the energy consumption is measured by the ADCs and DSP. In particular the energy consumption over a particular time interval cannot be completely calculated until the end of that time interval so there is an inherent delay between the time interval to which the measurement applies, and the associated time interval 422, 424 etc. which includes a pulse or a blink of the LED. It will also be appreciated, that methods according to the present disclosure are not dependent on any specific length of this delay. Methods according to one or more embodiments of the present disclosure thus may be more adaptable or flexible than other, known, methods, since the pulses are "decoupled" from the exact measurement time intervals, by the dequantizer.

From reading the present disclosure, other variations and modifications will be apparent to the skilled person. Such variations and modifications may involve equivalent and other features which are already known in the art of power metering, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

It is noted that one or more embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Features which are described in the context of separate embodiments may also be provided in combination in a single embodiment. Conversely, various features which are, for brevity, described in the context of a single embodiment, may also be provided separately or in any suitable sub-combination.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

The invention claimed is:

1. A power-meter apparatus comprising:
    a digital signal processor (DSP) configured to determine a respective consumed energy within each of a plurality of predetermined contiguous time intervals;
    a dequantizer configured to, for each time interval:
    determine a sum of a remainder and the consumed energy,
    calculate an integer pulse-count by dividing the sum of the remainder and the consumed energy by a predetermined pulse-quantum,
    calculate a new remainder by subtracting the product of the integer pulse-count and the pulse-quantum from the sum, and
    replace the remainder by the new remainder; and
    a pulse generator configured to, for each time interval, generate the integer pulse-count number of pulses of an indicator signal.

2. The power-meter apparatus of claim 1, wherein the indicator signal is an LED, and each pulse of the indicator signal is a blink of the LED.

3. The power-meter apparatus of claim 2, wherein each blink of the LED has a same on-time.

4. The power-meter apparatus of claim 1, wherein the pulse generator:
    is configured to receive the pulse-count and the new remainder from the dequantizer, and
    comprises a pulse-smoothing unit configured to adjust a timing of the pulses of the indicator signal.

5. The power-meter apparatus of claim 4, wherein the pulse-smoothing unit is configured to adjust the timing of the pulses of the indicator signal in response to the remainder, to tend to equalise a frequency of the pulses for a plurality of time intervals.

6. The power-meter apparatus of claim 1, further comprising,
a current meter and first analog-to-digital converter, configured to make a plurality of current measurements in each time interval; and
a voltage meter and a second analog-to-digital converter, configured to make a plurality of voltage measurements in each time interval.

7. The power-meter apparatus of claim 6, wherein
the DSP is configured to calculate a plurality of power values in each time interval from the plurality of current measurements and the plurality of voltage measurements, and to determine the respective consumed energy from the plurality of power values.

8. The power-meter apparatus of claim 1, further comprising
a register configured to store the remainder as a digital value.

9. The power-meter apparatus of claim 1, wherein
the dequantizer is further configured to set the remainder to 0 prior to the first time interval.

10. The power-meter apparatus of claim 1, further comprising:
a monitor, configured to feedback, to the pulse generator, a number of generated pulses of the indicator signal.

11. A method of metering power consumption, the method comprising:
determining a respective consumed energy within each of a plurality of predetermined contiguous time intervals; and
for each time interval:
determining a sum of a remainder and the consumed energy,
calculating an integer pulse-count by dividing the sum of the remainder and the consumed energy by a predetermined pulse-quantum,
calculating a new remainder by subtracting the product of the integer pulse-count and the pulse-quantum from the sum,
replacing the remainder by the new remainder, and
generating the integer pulse-count number of pulses of an indicator signal.

12. The method of claim 11, wherein
the pulse of the indicator signal is a blink of an LED.

13. The method of claim 11, further comprising:
adjusting a timing of the pulses of the indicator signal by means of a pulse-smoothing unit.

14. The method of claim 11, further comprising adjusting the timing of the pulses of the indicator signal in response to the remainder, to tend to equalise a frequency of the pulses for a plurality of time intervals.

15. The method of claim 11, further comprising calculating a plurality of power values in each time interval from a plurality of current measurements and a plurality of voltage measurements, and determine the respective consumed energy from the plurality of power values.

16. The method of claim 11, further comprising
making a plurality of current measurements in each time interval; and
making a plurality of voltage measurements in each time interval.

17. The method of claim 16, wherein
calculating a plurality of power values in each time interval from the plurality of current measurements and the plurality of voltage measurements, and
determining the respective consumed energy from the plurality of power values.

18. The method of claim 11, further comprising
storing the remainder as a digital value in a register.

19. The method of claim 11, wherein
setting the remainder to 0 prior to a first time interval.

20. The method of claim 11, further comprising
providing a feedback of a number of generated pulses of the indicator signal.

* * * * *